United States Patent
Maier et al.

(10) Patent No.: US 7,103,513 B2
(45) Date of Patent: Sep. 5, 2006

(54) METHOD AND DEVICE FOR THE DETECTION AND PROCESSING OF SIGNALS FROM INDUSTRIAL PROCESSES

(75) Inventors: Rupert Maier, Eggolsheim (DE); Ralf Sykosch, Weilersbach (DE)

(73) Assignee: Siemens Aktiegesellschaft, Munich (DE)

( * ) Notice: Subject to any disclaimer, the term of this patent is extended or adjusted under 35 U.S.C. 154(b) by 48 days.

(21) Appl. No.: 10/501,997

(22) PCT Filed: Jan. 14, 2003

(86) PCT No.: PCT/DE03/00093

§ 371 (c)(1),
(2), (4) Date: Jul. 21, 2004

(87) PCT Pub. No.: WO03/060617

PCT Pub. Date: Jul. 24, 2003

(65) Prior Publication Data

US 2005/0119854 A1    Jun. 2, 2005

(30) Foreign Application Priority Data

Jan. 21, 2002   (DE) ............................... 102 02 092

(51) Int. Cl.
*G06F 19/00* (2006.01)
(52) U.S. Cl. ................ 702/189; 702/127; 702/182
(58) Field of Classification Search ........... 702/104, 702/105, 113, 114, 127, 182, 183, 186, 187, 702/189; 358/1.12, 443; 700/159, 170, 700/275; 73/816, 866.1, 866.3; 360/79, 360/101
See application file for complete search history.

(56) References Cited

U.S. PATENT DOCUMENTS

| 4,793,706 A | * | 12/1988 | Csillag et al. ............... 356/335 |
| 5,805,312 A | * | 9/1998 | Ozawa et al. ............... 358/503 |
| 5,970,430 A | | 10/1999 | Burns et al. |
| 6,803,854 B1 | | 10/2004 | Adams et al. |
| 2002/0004370 A1 | | 1/2002 | Lutke et al. |

FOREIGN PATENT DOCUMENTS

| DE | 697 17 838 T2 | 4/1998 |
| DE | 199 14 829 A1 | 1/2001 |
| DE | 199 53 189 A1 | 5/2001 |
| WO | WO 98/14848 A1 | 4/1998 |
| WO | WO 00/31597 A2 | 6/2000 |
| WO | WO 0133087 A2 * | 5/2001 |

* cited by examiner

*Primary Examiner*—Bryan Bui
(74) *Attorney, Agent, or Firm*—Harness, Dickey & Pierce, P.L.C.

(57) ABSTRACT

A standard, modularly expandable system is for measuring and analyzing far spread signals from industrial processes consisting of several partial processes in an essentially feedback-free and synchronous manner. Random signals occurring in the partial processes are detected by way of measuring heads, optionally provided with a time stamp, and transferred to a measuring bus system in a predefined form as measuring signals or time signals. The measuring bus system is not identical with existing automation-related bus systems. The measuring signals and/or time signals are further processed by data concentrators. Evaluation units and/or display units that are local or indefinitely removed from the industrial process make it possible to further process or visualize measuring signals and/or time signals. The measuring heads detect a standard time signal such as the one of the global positioning system.

30 Claims, 1 Drawing Sheet

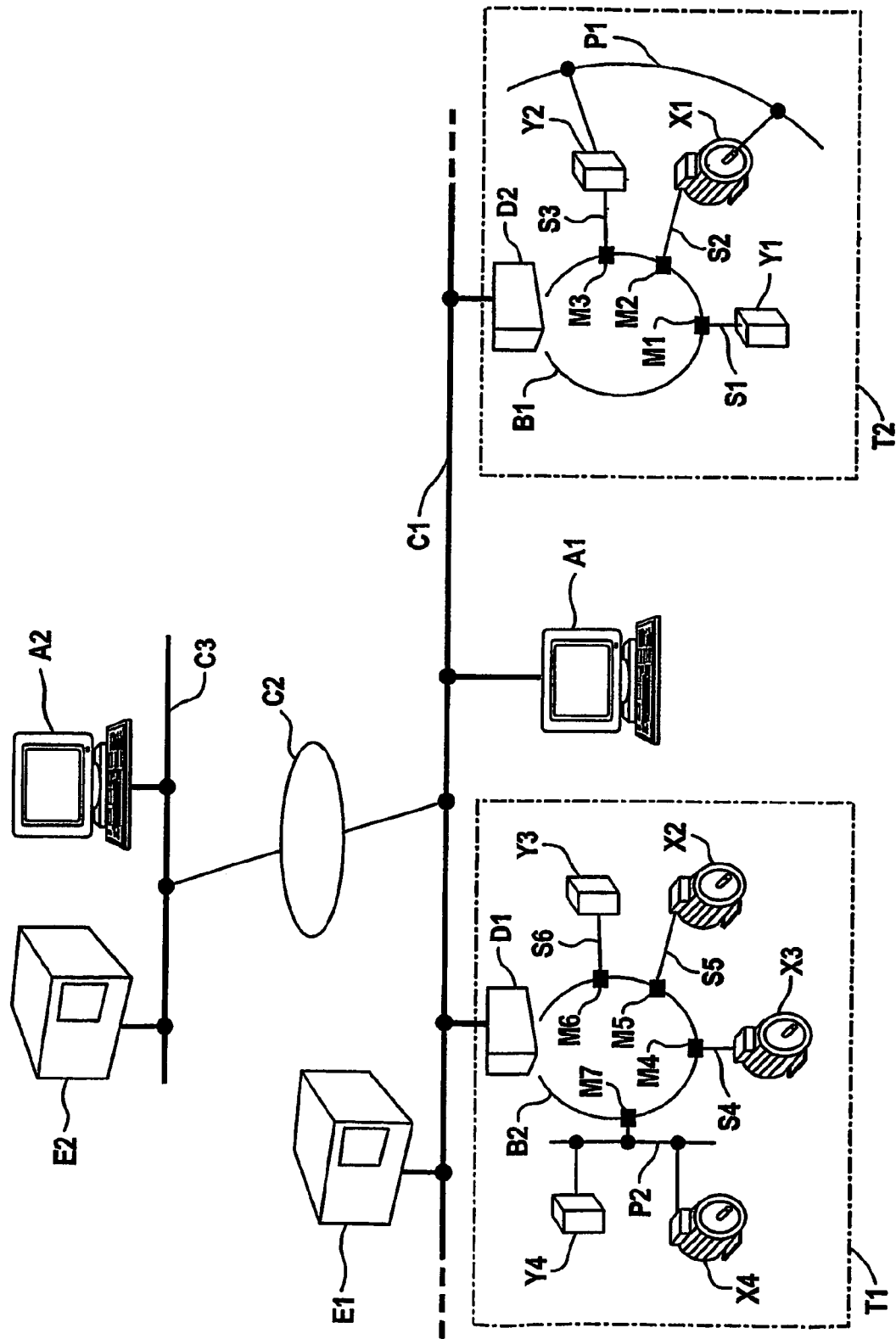

METHOD AND DEVICE FOR THE DETECTION AND PROCESSING OF SIGNALS FROM INDUSTRIAL PROCESSES

This application is the national phase under 35 U.S.C. § 371 of PCT International Application No. PCT/DE03/00093 which has an International filing date of Jan. 14, 2003, which designated the United States of America and which claims priority on German Patent Application number DE 102 02 092.2 filed Jan. 21, 2002, the entire contents of which are hereby incorporated herein by reference.

FIELD OF THE INVENTION

The invention generally relates to a method for acquiring and processing signals from industrial processes, and generally relates to a device.

BACKGROUND OF THE INVENTION

The acquisition and processing of signals from industrial processes form the basis for central real-time evaluation and the support of analytical and diagnostic functionalities both in situ and at a distance from the respective process. The latter is significant in particular for services of an equipment manufacturer such as, for example, remote monitoring and remote diagnostics.

The processes in question occur in industrial equipment which is generally composed of a plurality of equipment components which are usually spatially distributed. The processes in question are controlled and/or regulated by way of at least one automation device. The signals which are to be acquired and processed may originate from a very wide variety of sources and are present in any desired and different form, for example analog, binary, numerical, as video signals and/or as variable physical parameters.

A suitable method and a device for carrying out such a method for acquiring and processing signals must pick up signals from a large number of sources, it being possible for the spatial distribution of the sources to be very extensive. A suitable method must sense measuring signals precisely with continuously high quality and at the same time also be able to support high sampling rates. Easy and rapid activation with a low degree of complexity of wiring and configuration, as well as ease of operation, comparable with the "plug and play" principle, are expected from a corresponding device.

Especially if the individual partial processes of an industrial process are spatially distributed over a wide area, methods and devices for acquiring and processing signals from industrial processes are known which are implemented by way of individual, different partial methods and devices with respectively different performance spectrums and characteristics or by integration into existing control systems, or both.

SUMMARY OF THE INVENTION

There is no overall system known which is composed of a uniform and modular device which satisfies the previously specified requirements and which also permits synchronous and largely reaction-free acquisition of the signals present in the equipment. Methods for acquiring and processing signals from industrial processes in industrial equipment which is preferably spatially distributed over a wide area and which fulfills all the requirements mentioned above, and also is both capable of being used easily and universally and ensures precise, very largely reaction-free and synchronous acquisition of signals, are also not known.

An object of an embodiment of the invention is to make available a method and a device for acquiring and processing signals from industrial processes in such a way that at least one of, and preferably both, the indicated requirements are fulfilled and at least one of the aforesaid disadvantages are avoided.

An object may be achieved according to an embodiment of the invention by a method, and according to an embodiment of the invention by a device.

The method according to an embodiment of the invention and the corresponding device are of uniform and modular design. The concept on which an embodiment of the invention is based is to separate measurement and analysis on the one hand, and control and regulation on the other. In particular, the implementation of this concept permits very largely reaction-free acquisition of signals and the implementation of a uniform system of the type mentioned at the beginning which can be used in various ways, is high in power and can be expanded in a modular and cost-effective way.

In one preferred embodiment of the method according to an embodiment of the invention, at least one measuring head receives, at the input end, measuring signals from any desired bus system. As a result, the very largely reaction-free reception of the signals which are exchanged via the bus system and/or the analysis of signal faults on the bus system itself are made possible.

The method according to an embodiment of the invention can advantageously be configured in such a way that at least one measuring head passes on measuring signals at the output end directly to a data concentrator, as a result of which the modularity of the system according to the invention is further increased.

According to one advantageous configuration of an embodiment of the invention, the setup of the communication between data concentrators and measuring heads is carried out automatically using at least one communication unit. Both configurations decisively increase the modularity of the method which in this way can be expanded very easily and at low cost and complexity.

In one preferred embodiment of the method according to an embodiment of the invention, time signals are generated by providing measuring signals with a time stamp. As a result, an evaluation of the acquired measurement signals is made considerably easier, specifically in particular with respect to complex relationships which extend over a plurality of partial processes.

The method according to an embodiment of the invention is advantageously expanded in such a way that at least one measuring head receives a standardized time signal. Using this time signal as a reference time permits unambiguous and precise chronological assignment of measuring signals beyond the boundaries of the individual process to which the method according to the invention relates.

In a further configuration of the invention, the standardized time signal is acquired from a Global Positioning System (GPS). The advantage of this configuration of an embodiment the invention is the worldwide availability of GPS and the low costs which are associated with the acquisition of this standardized time signal.

According to a further advantageous configuration of the method according to an embodiment of the invention, the time signals and/or measuring signals which originate from at least one data concentrator are processed using at least one programmable evaluation unit, it being possible for the programmable evaluation unit to be located at any desired spatial distance from the partial processes. As a result, the flexibility and the universal applicability of the method are increased. The separation of tasks according to the concept which is provided for the data concentrators and evaluation units means that resources are used particularly economically.

The method according to an embodiment of the invention can preferably be configured in such a way that at least one display unit is used to display data which is generated from the measuring signals and/or time signals, it being possible for the display unit to be located at any desired spatial distance from the partial processes. Such an expansion increases modularity and flexibility of the method according to an embodiment the invention, the spatial independence of the display unit from the industrial partial processes also permits functionalities such as remote analysis and as a result increases both the efficiency and economic viability of the intellectual evaluation of measuring results and makes it significantly easier to use expert knowledge for evaluation.

The method according to an embodiment the invention can be carried out by a device for acquiring and processing signals from industrial processes which are composed of at least one partial process, the industrial process being controlled and/or regulated by at least one automation device which is equipped with one or more bus systems. The device according to an embodiment of the invention includes at least one measuring bus system is provided which is not identical to the bus system or systems of the automation device, and in that at least one measuring head for acquiring measuring signals is provided and is connected at the input end to signal generators of the industrial process which are present and/or which are to be additionally provided, and at the output end passes on signals in a predefined form to the measuring bus system, in that one or more data concentrators are connected to the measuring bus system, and wherein a device are provided for automatically detecting measuring heads and/or data concentrators.

In one advantageous configuration of the device according to an embodiment of the invention, at least one measuring head, which is connected to a signal generator which supplies a standardized time signal, is mounted on the upper termination of a device within which, or by which, the industrial process is carried out. This mounting permits improved reception of the standardized time signal if the latter is transmitted in a wire free fashion, in particular using a transmission device which are not exclusively earth bound, for example satellites.

According to a further advantageous configuration of the device according to an embodiment of the invention, the data concentrators are conditioned so as to be capable of being expanded in such a way that the respectively required number of measuring bus systems and/or measuring heads can be connected to them. Measuring bus systems and/or measuring heads can therefore be connected in an uncomplicated way, saving time and cost. In this way, the system can be expanded easily as desired.

BRIEF DESCRIPTION OF THE DRAWINGS

Further advantages, features and details of the invention will become evident from the description of illustrated exemplary embodiments given hereinbelow and the accompanying drawings, which are given by way of illustration only and thus are not limitative of the present invention, wherein:

FIG. 1 shows a schematic illustration of a measuring and analysis system according to an embodiment of the invention.

DETAILED DESCRIPTION OF THE PREFERRED EMBODIMENTS

FIG. 1 is a schematic illustration of a measuring and analysis system for an industrial process. In the example shown, the process is divided into two partial processes T1 and T2. Signals are to be acquired and processed within these partial processes T1 and T2.

Signal generators S1 to S6 (not illustrated in more detail) are located at the equipment components X1 to X3 and Y1 to Y3 and are connected to corresponding measuring heads M1 to M6. The equipment components which are illustrated by way of example in the drawing are the motors X1 to X4 and the switchgear cabinets Y1 to Y4.

There are the bus systems P1 and P2 and further bus systems (not illustrated in more detail) which are to be assigned to the automation device of the industrial partial processes T1 and T2. The bus systems P1 and P2 are used to control and regulate the equipment components X1 and Y2 and X4 and Y4. As is shown by way of example on the bus system P2 and the measuring head M7, measuring heads can also be connected to bus systems which are used for control and regulation.

The measuring heads M1 to M7 are connected at the output end to the data concentrators D1 and D2 using the measuring bus systems B1 and B2. One task of the data concentrators D1 and D2 is to process the time signals and/or measuring signals of the measuring heads M1 to M7.

The evaluation units E1 and E2 are provided for further processing of the signals and data. The display units A1 and A2 make it possible to display measuring data which is processed by the data concentrators D1 and D2 or the evaluation units E1 and E2. The evaluation units E1 and E2, the display units A1 and A2 and the data concentrators D1 and D2 are connected to one another via local and/or spatially unlimited data transmission networks C1 to C3.

Partial process in the sense of an embodiment of the invention may be understood to be, on the one hand, an actual partial process within an industrial process. On the other hand, a partial process itself may be understood to be an industrial process so that two or more partial processes are equivalent in meaning to two or more industrial processes. As a result, for example one or more partial processes could be assigned to the fabrication process of an automobile manufacturer, while one further partial process could be the industrial process of a supplier.

One or more partial processes T1 and T2 in which signals are acquired may also be of a nonindustrial character. A partial process of nonindustrial character may be understood to include but is not limited to, for example, a process assigned to the private or public health system, official authorities or institutions, private individuals, institutions for general welfare or generally institutions which are understood as not being associated with industry.

Partial processes T1 and T2 are defined in such a way that there is the possibility that, within the scope of one or more partial processes T1 and T2, nonindustrial equipment, such as, for example, magnetic resonance tomographs, is connected to one or more measuring bus systems B1 and B2.

In the exemplary embodiment, time signals are generated in that measuring signals are provided with a synchronously running time stamp.

The measuring heads M1 to M7 are configured in such a way that they receive numerical, binary or analog signals from signal generators. However, measuring heads which acquire physical variables such as, for example, oscillation period or temperature, and which are not illustrated in the drawing, are also provided. Measuring heads may be connected to bus systems, for example PROFIBUS or CAN bus, which are used for controlling and regulating. The measuring head M7 which is connected to the bus system P2 acquires data which is present on the bus system P2 and which can be used to analyze signal faults on the bus system P2, or make available further measuring data under the precondition that this is carried out very largely without feedback and in a precisely timed way. The term precisely timed is understood to mean synchronous in the resolution of half the minimum sampling time.

All the measuring heads M1 to M7 are composed of a uniform bidirectional communications part and have the functionalities for independently acquiring and generating the measuring data, and drivers for receiving data from the data concentrator. The measuring bus systems B1 and B2 use a uniform transmission protocol and are uniformly based on optical waveguide technology in order to ensure minimum expenditure on cabling and configuration and a high degree of immunity to faults.

It is possible, but not illustrated in more detail, for measuring heads to be connected directly to a data concentrator D1 or D2. The arrangement of data concentrator and of plugged-in measuring head then results in a unit which, under certain circumstances, is associated with a saving in space and cost. The data concentrators D1 and D2 are designed to be capable of being expanded in terms of the number of measuring bus systems B1 and B2 which can be connected, and measuring heads which can be plugged directly.

Each of the data concentrators D1 and D2 includes at least one computing unit and at least one communications unit.

An object of the communications unit may include the independent, automatic operation of the measuring bus systems B1 and B2 of the device, the setup of the communication with the connected measuring heads M1 to M7 via the measuring bus systems B1 and B2, as well as the automatic acquisition of the components which are located in the system, and the automatic monitoring of individual components for compatibility. In each communications unit, a structured storage matrix is made available in which a uniquely defined address is present for each measuring head which is assigned to the data concentrator and each assigned measuring signal or time signal. The communications units also make it possible for the measuring processes of all the measuring heads and of all the data concentrators present in the system to be synchronized automatically with a common time base. Communications units have devices for self-diagnosis, devices for feeding in extraneous signals and the functionality for automatic load distribution between the data concentrators which are used in the system.

An object of the computing unit may include processing time signals and measuring signals. The computing unit carries out a chronological vectorization of the incoming data and archives the vectors on read only memories in order to prevent data losses. An object of the computing unit may further include taking into account different sampling rates, to smooth the measuring signals and, if necessary, interpolating common sampling times.

The evaluation units E1 and E2 have functionalities for largely processing measuring signals and time signals from different data concentrators D1 and D2. The evaluation units E1 and E2 can be programmed by the user by means of a graphic editor and have a library of functionalities, for example for filtering or transforming measuring signals or signal vectors.

By way of the display units A1 and A2, it is possible to graphically represent selected measuring data in real time. The evaluation units E1 and E2 and the display units A1 and A2 can be accessed both locally and also by means of spatially limited or unlimited data transmission networks. The evaluation units E1 and E2 support automatic monitoring by virtue of the fact that they output messages when there are predetermined data constellations in order, for example, to trigger an alarm at at least one of the display units A1 and A2. This may be carried out, for example, using an e-mail or else also using a short message via a mobile radio network.

While the measuring bus systems B1 and B2 are uniformly designed for optical waveguide technology, this is not the case with the data transmission networks C1 to C3. In the drawing, the data transmission networks C1 and C3 constitute local networks with a high transmission rate and use of the TCP/IP protocol family. The data transmission network C2 extends spatially over a significantly larger area and constitutes a digital telecommunications network.

In one application example, the partial process T1 constitutes part of the fabrication process of an automobile manufacturer. Further, the partial process T2 constitutes an industrial process at the factory of a supplier company. In spite of the process structures, which are different here in both the partial processes T1 and T2, and in spite of the different automation systems, the analysis of systems and problems can be carried out by way of the uniform system according to an embodiment of the invention.

Problems which extend beyond individual partial processes T1 and T2 can be reliably detected and analyzed using the data concentrators D1 and D2 and the evaluation units E1 and E2 and display units A1 and A2 which are provided at a distance from the partial processes T1 and T2. Here, it is made easier, for example, for external experts to carry out problem analysis and to understand relationships by virtue of the fact that measuring signals are provided with a time stamp which is based on a uniform system time and is, if appropriate, standardized, which goes beyond mere synchronization of the measuring signals.

When restructuring is carried out within the industrial process, the measuring bus systems B1 and B2 and the measuring heads M1 to M7 can easily be adapted to the new conditions brought about by the restructuring, or correspondingly expanded. The decoupling of the measuring and analysis devices according to an embodiment of the invention from existing automation devices of the industrial process also permits not only a high degree of freedom from reaction during the acquisition of measuring data but also a uniform acquisition and analysis of measuring data during restructuring within the industrial process. As a result, a direct comparison and the analysis of process features before and after restructuring is made possible.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for acquiring and processing signals from industrial processes including at least one partial process, the industrial process being at least one of controlled and regulated by at least one automation device equipped with at least one bus system, that the method comprising:

using at least one measuring bus system which is not identical to the at east one bus system of the automation device;

acquiring measuring signals using at least one measuring head, the measuring head acquiring measuring signals at an input end from signal generators of the industrial process which are at least one of present and additionally provided and passing on these measuring signals at an output end to the measuring bus system in a predefined form;

further processing the measuring signals by at least one data concentrator; and automatically detecting at least one of measuring heads and data concentrators.

2. The method as claimed in claim 1, wherein at least one measuring head (M7) receives, at the input end, measuring signals from any desired bus system.

3. The method as claimed in claim 1, wherein at least one measuring head passes on measuring signals directly to a data concentrator at the output end.

4. The method as claimed in claim 1, wherein the setup of the communication between data concentrators and measuring heads is carried out automatically using at least one communications unit.

5. The method as claimed in claim 1, wherein all the time signals are generated by providing measuring signals with a time stamp.

6. The method as claimed in claim 1, wherein at least one measuring head receives a standardized time signal.

7. The method as claimed in claim 6, wherein the standardized time signal is acquired from a Global Positioning System.

8. The method as claimed in claim 7, wherein at least one of the time signals and measuring signals which originate from at least one data concentrator are processed using at least one programmable evaluation unit, the programmable evaluation unit being located at any desired spatial distance from the partial processes.

9. The method as claimed in claim 8, wherein at least one display unit is used to display data which is generated from at least one of the measuring signals and time signals, the display unit being located at any desired spatial distance from the partial processes.

10. The method as claimed in claim 7, wherein at least one display unit is used to display data which is generated from at least one of the measuring signals and time signals, the display unit being located at any desired spatial distance from the partial processes.

11. The method as claimed in claim 6, wherein at least one of the time signals and measuring signals which originate from at least one data concentrator are processed using at least one programmable evaluation unit, the programmable evaluation unit being located at any desired spatial distance from the partial processes.

12. The method as claimed in claim 6, wherein at least one display unit is used to display data which is generated from at least one of the measuring signals and time signals, the display unit being located at any desired spatial distance from the partial processes.

13. The method as claimed in claim 1, wherein the measuring signals which originate from at least one data concentrator are processed using at least one programmable evaluation unit, the programmable evaluation unit being located at any desired spatial distance from the partial processes.

14. The method as claimed in claim 1, wherein at least one display unit is used to display data which is generated from the measuring signals, the display unit being located at any desired spatial distance from the partial processes.

15. A device for acquiring and processing signals from industrial processes including at least one partial process, the industrial process being at least one of controlled and regulated by at least one automation device equipped with at least one bus system, that the device comprising:

at least one measuring bus system, which is not identical to the at least one bus system of the automation device;

at least one measuring head for acquiring measuring signals, connected at an input end to signal generators of the industrial process which are at least one of present and additionally provided, and at an output end, passes on signals in a predefined form to the measuring bus system;

at least one data concentrator, connected to the measuring bus system; and means for automatically detecting at least one of measuring heads and data concentrators.

16. The device as claimed in claim 15, wherein at least one measuring head, connected at the input end to any desired bus system, is provided.

17. The device as claimed in claim 16, wherein at least one measuring head, directly connected at the output end to a data concentrator, is provided.

18. The device as claimed in claim 15, wherein at least one measuring head, directly connected at the output end to a data concentrator, is provided.

19. The device as claimed in claim 15, wherein a communications unit, which permits the automatic setup of the communication between data concentrators and measuring heads, is provided.

20. The device as claimed in claim 15, wherein at least one measuring head, connected to a signal generator which supplies a standardized time signal, is provided.

21. The device as claimed in claim 20, wherein at least one of the measuring heads is mounted on the upper termination of a device within which, or by which, the industrial process is carried out.

22. The device as claimed in claim 14, further comprising: at least one display unit for displaying data generated from at least one of the measuring signals and time signals, the display unit being located at any desired spatial distance from the partial processes.

23. The device as claimed in claim 15, further comprising: at least one programmable evaluation unit, the programmable evaluation unit being located at any desired spatial distance from the partial processes.

24. The device as claimed in claim 15, wherein the data concentrators are conditioned so as to be expandable in such a way that the at least one of the respectively required number of measuring bus systems and measuring heads are connectable to them.

25. The device as claimed in claim 15, further comprising: at least one display unit for displaying data generated from the measuring signals, the display unit being located at any desired spatial distance from the partial processes.

26. A device for acquiring and processing signals from industrial processes including at least one partial process, the industrial process being at least one of controlled and regulated by at least one automation device equipped with at least one bus system, that the device comprising:
- at least one measuring bus system, which is not identical to the at least one bus system of the automation device;
- means for acquiring measuring signals, connected at an input end to signal generators of the industrial process, and at an output end, for passing on signals in a predefined form to the measuring bus system;
- at least one data concentrator, connected to the measuring bus system; and
- means for automatically detecting at least one of measuring heads and data concentrators.

27. The device as claimed in claim 26, wherein the means for acquiring includes at least one measuring head, connected at the input end to any desired bus system.

28. The device as claimed in claim 26, wherein the means for acquiring includes at least one measuring head, directly connected at the output end to a data concentrator.

29. The device as claimed in claim 26, further comprising:
- means for permitting automatic setup of the communication between data concentrators and measuring heads.

30. The device as claimed in claim 26, wherein the means for acquiring includes at least one measuring head, connected to a signal generator which supplies a standardized time signal.

* * * * *